Figure 1:
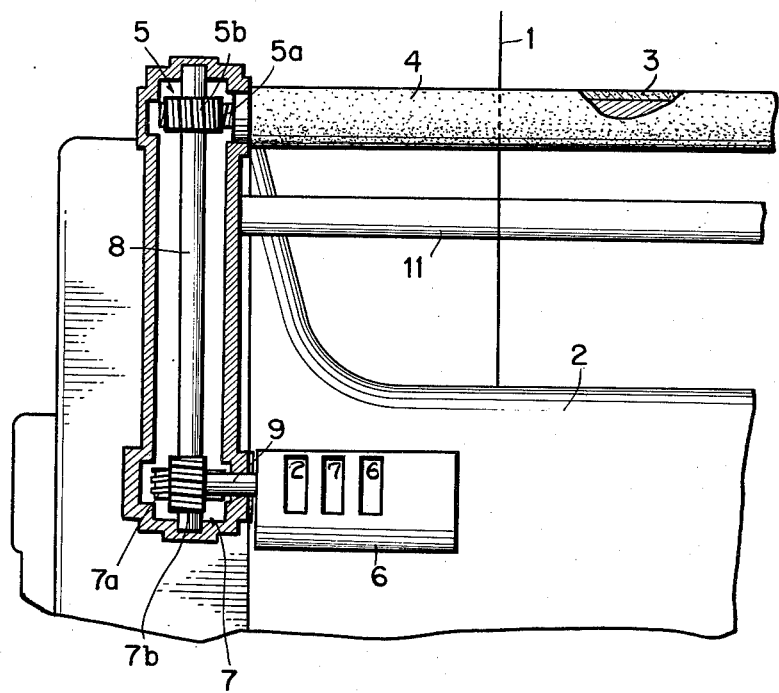

ies Patent [19]
Miyamae

[11] 3,909,949
[45] Oct. 7, 1975

[54] FISHING LINE LENGTH INDICATOR MEANS
[76] Inventor: Toshiaki Miyamae, 16, 2-Ban, 2-Chome, Nishi-Iwata, Higashi-Osaka, Osaka, Japan
[22] Filed: Aug. 30, 1973
[21] Appl. No.: 393,062

[30] Foreign Application Priority Data
Sept. 22, 1972 Japan............................ 47-110440

[52] U.S. Cl.............. 33/129; 33/134 R; 242/84.1 M
[51] Int. Cl.² ...................... G01B 5/04; G01B 3/12
[58] Field of Search................ 33/127, 129, 134 R; 242/84.1 M

[56] References Cited
UNITED STATES PATENTS
1,403,164   1/1922   Hosch .................................. 33/127
1,485,096   2/1924   Tiller ................................. 33/134 R
1,647,127   11/1927  Fitch .................................. 33/129
2,500,026   3/1950   Erickson ............................. 33/134 R
2,637,112   5/1953   Fontaine et al. .................... 33/134 R
2,752,686   7/1956   Anderson et al. ..................... 33/129
2,960,773   11/1960  Mott .................................. 33/134 R Primary Examiner—Richard E. Aegerter
Assistant Examiner—Richard R. Stearns
Attorney, Agent, or Firm—Toren, McGeady and Stanger

[57] ABSTRACT

In a fishing line length indicating device for use with existing standard fishing reels, the device includes a shaft which is parallel to the axis of a spool and movable by the running motion of a fishing line being rewound onto the spool. The moving force of the shaft is reduced, directionally changed and transmitted through transmission gear mechanisms to another shaft connected to an implement board thereby actuating the same for numerically indicating the underwater length of the fishing line which fishermen can easily confirm visually.

2 Claims, 2 Drawing Figures

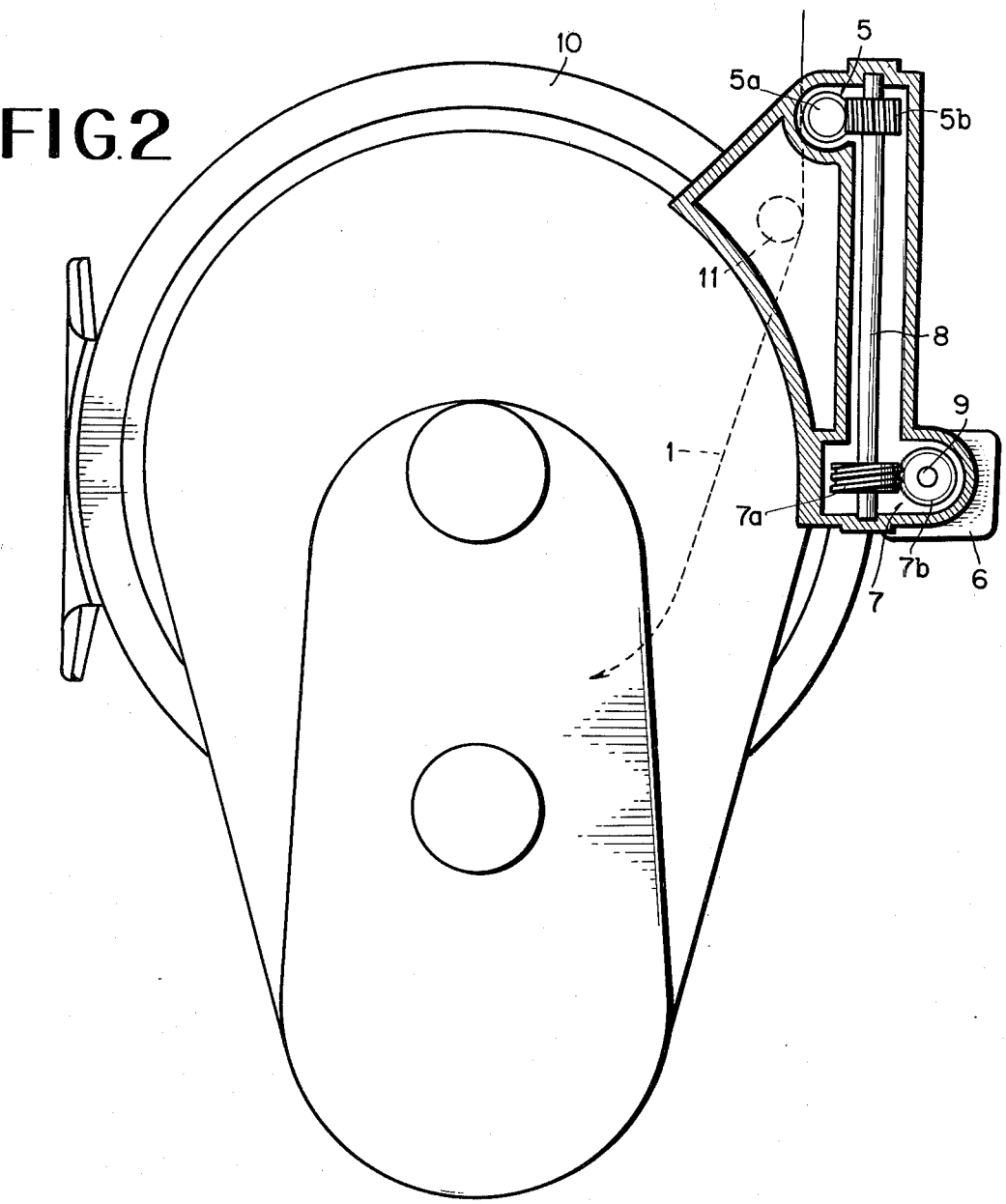

FISHING LINE LENGTH INDICATOR MEANS

The present invention relates generally to a fishing line length indicator means for use with a fishing reel, and more particularly it relates to an implement board adapted to numerically indicate the exact underwater length of a fishing line which a fisherman is always able to confirm by the eye.

When angling offshore by boat, some hundred feet of fishing line is cast to the sea surface target or vertically dropped deep in the sea. Then, once a fish is caught with success or even when the fish has just bitten, fisherman would collectively cast the fishing line in the same sea surface target or drop the same into the same depth of the sea because they know through experience that the fish instinctively shoal in a range of fixed depths.

For the above-mentioned reason, it is absolutely necessary for fisherman to always confirm in what depth of the aimed sea surface target the fishing line must be kept in order to get a good catch.

However, the conventional type fishing line length indicator means available on the market are not always satisfactory since some of them are very complicated in structure and difficult to handle while others are very high in manufacturing cost beyond fishermen's individual purchasing capacity.

Accordingly, the present invention has been designed to eliminate the above-mentioned drawbacks and disadvantages, having as one of its main object the provision of a fishing line length indicator means which is easily applicable to most of the existing standard type fishing reels.

It is another object of the invention to provide a fishing line length indicator means which can be produced at a low cost.

It is a further object of the invention to provide a fishing line indicator means which is structurally simplified and very easy to handle.

These and other objects, features and advantages of the present invention will become apparent from the following detailed description when taken in conjunction with the accompanying drawing, in which:

FIG. 1 is a partial front view partly in section showing the elemental parts of the fishing line length indicator means embodied in accordance with the invention; and FIG. 2 is a left hand side view partly in section showing the elemental parts of the indicator means illustrated in FIG. 1.

Setting forth in detail a preferred embodiment carrying out the present invention with reference to the accompanying drawing, reference numeral 1 designates a fishing line whose running motion caused when rewound onto a spool 2 is employed to drive a fishing line length indicator means which will be described hereinafter.

In case of rewinding the fishing line 1 onto a fishing reel provided with the fishing indicator means of the present invention, said fishing line 1 is normally kept in abutment with the outer rough peripheral circumferential surface portion of a resilient cylinder 3 fully covering a rotatable shaft 4 rotatably supported in parallelism with the axis of the spool 2 on the upper edges of drum shape faces formed at both sides of said spool.

The rotatable shaft 4 supports at its one end (at the left hand side with respect to FIG. 1 of the drawing) a worm 5a engaged with a worm gear 5b supported on one end of a similar rotatable shaft 8 extending at a right angle to the rotatable shaft 4 thereby to form a first transmission gear mechanism 5. Likewise, the other end of said rotatable shaft 8 supports a worm 7a engaged with a worm gear 7b supported on one end of a rotatable shaft 9 thereby to form a second transmission gear mechanism 7.

On the other end of rotatable shaft 9 supporting the worm gear 7b there is mounted an indicating means or implement board 6 for numerically showing the number of revolutions of said shaft 9 being rotated through said first and second transmission gear mechanisms 5 and 7 by means of the rotatable shaft 4 which is directly rotated with the running motion of the fishing line portion 1 being rewound onto the spool 2 in forcibly contacted relation with the outer peripheral surface portion of the resilient cylinder 3 covering the shaft 4.

Due to this arrangement of the indicating means 6, the actual underwater length of the fishing line 1 can be exactly confirmed by reading figures appearing on the indicating means 6.

In the above-mentioned construction of the invention, the spool 2 is rotated by means of an electric motor (not shown in the drawing) which can be energized by dry cells or battery.

Prior to being rewound onto the spool 2, the fishing line 1 is forced to the outer peripheral surface portion of the resilient cylinder 3 covering the rotatable shaft 4 by means of a fishing line pressing rod 11 which is rigidly fixed to a casing 10 as is clearly shown in FIG. 2.

If each diameter and rotational ratio of said two worms 5a, 7a forming elemental parts of said first and second transmission gear mechanisms 5 and 7 is made the same, the rotatable shaft 9 for actuating the indicating means 6 will rotate at the same speed that the rotatable shaft 4 is rotated subject to the running motion of the fishing line 1 so that the revolutions of the rotatable shaft 4 are numerically indicated on the indicating means 6 merely by obtaining the product of the revolutional number of the rotatable shaft 4 and the outer peripheral length thereof.

However, it is preferable that said outer circumferential length of the rotatable shaft 4 and each rotational ratio of said worms 5a, 7a and said worm gears 5b, 7b are pre-determined in such a suitable manner that the underwater length of the fishing line 1 can be indicated in metric unit on the indicating means 6.

As is clearly understood from the foregoing, the operation of the fishing line length indicating means constructed in the above-mentioned manner is such that the rotatable shaft 4 is rotated subject to the running motion of the fishing line 1 forced to frictionally abut on the outer peripheral surface portion of the resilient cylinder 3 by means of the fishing line pressing rod 11. This rotation of the shaft 4 is reduced by means of the worm gear 5b engaged with the worm 5a fixedly supported on the end of the shaft 4 so that the worm gear 7b engaged with the worm 7a fixed to the lower end of the shaft 8 is caused to rotate at a reduced speed. This has a result that the rotation of the worm gear 7b is indicated on the indicating means 6 in the form of the number of revolutions of the worm gear 7b or in the form of metric units showing the underwater length of the fishing line 1.

Meanwhile, in case that the indicating means 6 is adapted to indicate nothing but the number of the revolutions of the rotatable shaft 4, fishermen have only to mentally calculate the product of the outer circumferential length of the shaft 4 by the number of revolutions thereof and reduction ratio, whereby they can easily know the actual underwater length of the fishing line 1. In other words, the fishing line length indicating means of the present invention is actuated at a reduced speed through the first and second transmission gear mechanisms 5, 7 driven by the rotatable shaft 4 rotated by the running motion of the fishing line 1 being rewound onto the spool 2. Thus it is clearly understood that the underwater length of the fishing line 1 appearing on the indicating means 6 in the form of the number of revolutions of the rotatable shaft 4 or in the form of metric units has an exact numerical value.

Thus by use of the fishing line length indicating means 6 provided on the existing standard fishing reel, a fisherman can have a good catch by dropping the fishing line 1 as repeadtedly as he wants into the same depths as that wherein he could catch a fish with success or even feel a fish bite at a bait through his rod.

Furthermore, the indicating means 6 of the invention is structurally so simple that it is producible at a low cost and hardly subjected to breakdown.

While in the foregoing embodiment of the invention, the worm gears 5b and 7b are employed to transmit a rotatory force in different directions and reduce the same force before it is transmitted to the indicating means, any other suitable mechanisms may be replaced for these purposes.

Though one specific embodiment of the present invention has been shown and described herein, it will be apparent to those skilled in the art that the invention is not restricted to the details set forth but many changes and modifications may be made without departing from the spirit and scope of the invention as defined in the annexed claims.

What is claimed is:

1. A fishing line length indicating device comprising a casing including a pair of spaced drum shaped end faces, a spool rotatably mounted on said casing and extending between said drum shaped end faces, said spool arranged to wind a fishing line thereon, a first shaft rotatably mounted on the radially outer edges of said drum faces and disposed in parallel relation with the axis of rotation of said spool so that said first shaft is spaced radially outwardly from the surface on said spool on which the fishing line is wound with the circumferential surface of said first shaft located opposite the circumferential surface of said spool on which the fishing line is wound so that the fishing line being wound on said spool passes over the circumferential surface of said first shaft, a resilient cylinder covering the circumferential surface of said first shaft and having a rough outer circumferential surface, a second shaft rigidly fixed to said casing and disposed in generally parallel relation with said first shaft and located radially inwardly from said first shaft toward said spool, the axis of said second shaft being located approximately in the plane passing through the axes of rotation of said spool and said first shaft so that the fishing line being wound on said spool passes over and in contact with said second shaft so that the fishing line is biased by its contact with said second shaft into positive contact with the rough outer circumferential surface on said resilient cylinder covering said first shaft, and means mounted on said casing and operatively connected to said first shaft for providing a visual indication of the actual underwater length of the fishing line unwound from said spool.

2. A fishing line length indicating device, as set forth in claim 1, wherein said means includes a first worm formed on one end of said first shaft and being rotatable therewith, a third shaft extending transversely of said first shaft at the end thereof on which said worm is formed, a first worm gear mounted on said third shaft and disposed in meshed engagement with said worm on said first shaft so that said first shaft rotates said third shaft, a second worm mounted on said third shaft in spaced relation to said first worm gear, a fourth shaft extending transversely of said third shaft and spaced from said first shaft, a second worm gear mounted on said fourth shaft and disposed in meshed engagement with said second worm on said third shaft so that said third shaft through the medium of said second worm and second worm gear rotates said fourth shaft, and an indicating means connected to said fourth shaft for providing a visual indication of the length of the fishing line unwound from said spool.

* * * * *